(12) United States Patent
Rydman

(10) Patent No.: US 7,398,384 B2
(45) Date of Patent: *Jul. 8, 2008

(54) METHODS AND APPARATUS FOR ACQUIRING EXPANSION READ ONLY MEMORY SIZE INFORMATION PRIOR TO OPERATING SYSTEM EXECUTION

(75) Inventor: Thomas J Rydman, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/751,384

(22) Filed: May 21, 2007

(65) Prior Publication Data

US 2007/0220196 A1    Sep. 20, 2007

Related U.S. Application Data

(63) Continuation of application No. 10/354,351, filed on Jan. 30, 2003, now Pat. No. 7,254,703.

(51) Int. Cl.
G06F 9/00 (2006.01)

(52) U.S. Cl. .......................... 713/2; 710/104

(58) Field of Classification Search ................ 710/104; 713/2
See application file for complete search history.

(56) References Cited

U.S. PATENT DOCUMENTS

| | | | |
|---|---|---|---|
| 5,559,958 A * | 9/1996 | Farrand et al. ............. 714/27 |
| 5,671,413 A * | 9/1997 | Shipman et al. ............ 713/2 |
| 6,119,185 A | 9/2000 | Westerinen et al. | |
| 6,282,647 B1 | 8/2001 | Leung et al. | |
| 6,397,268 B1 | 5/2002 | Cepulis | |
| 6,865,669 B1 | 3/2005 | Mahmoud | |

OTHER PUBLICATIONS

PCI Special Interest Group, PCI Local Bus Specification, Revision 2.2, Dec. 18, 1998.*
System Management BIOS Reference Specification Version 2.3.1. http://www.dmtf.org/standards/bios.php. Mar. 16, 1999, 99 pages.

* cited by examiner

Primary Examiner—Chun Cao
Assistant Examiner—Albert Wang
(74) Attorney, Agent, or Firm—Hanley, Flight & Zimmerman, LLC

(57) ABSTRACT

Methods and apparatus for acquiring expansion read only memory size information prior to operating system execution are disclosed. The disclosed methods and apparatus access an instance of a data structure generated prior to execution of an operating system and display boot phase memory usage information associated with an expansion read only memory.

20 Claims, 5 Drawing Sheets

| Offset | Name | Length | Value |
|---|---|---|---|
| 00h | Type | BYTE | Definable |
| 01h | Length | BYTE | 0Bh |
| 02h | Handle | WORD | Varies |
| 04h | Expansion ROM Space | BYTE | Varies |
| 05h | Bus | BYTE | Varies |
| 06h | Device Function | BYTE | Varies |
| 07h | Load Size | BYTE | Varies |
| 08h | Runtime Size | BYTE | Varies |
| 09h | Slot Location | BYTE | Varies |
| 0Ah | Status | BYTE | Varies |

METHODS AND APPARATUS FOR ACQUIRING EXPANSION READ ONLY MEMORY SIZE INFORMATION PRIOR TO OPERATING SYSTEM EXECUTION

RELATED APPLICATION

This application is a continuation of prior U.S. patent application Ser. No. 10/354,351, filed Jan. 30, 2003, now U.S. Pat. No. 7,254,703, the specification of which is hereby incorporated by reference herein in its entirety.

FIELD OF THE DISCLOSURE

The present disclosure relates generally to processor systems and, more specifically, to methods and apparatus for acquiring expansion read only memory size information prior to operating system execution.

BACKGROUND

The early phases of computer or processor system operation (i.e., prior to execution of an operating system by the processor system) following a power up or reset are controlled by a basic input/output system (BIOS). In general, the BIOS is implemented as software or machine readable instructions that are stored in a non-volatile memory coupled to a processor, which executes the BIOS instructions following a reset operation or the application of power. Typically, the BIOS performs one or more hardware and software configuration and test activities prior to executing the operating system. The configuration activities are responsible for establishing the manner in which hardware devices (e.g., disk drives, video controllers, keyboard interfaces, etc.) associated with the processor system interact with the operating system executed by the processor system. The test activities are responsible for collecting system configuration information that may be later used, for example, by the operating system to determine that hardware or devices associated with the system are ready for use and to facilitate debugging activities, configuration management activities, etc.

The System Management BIOS (SMBIOS) standard (e.g., SMBIOS 2.3.1) has been widely adopted by many processor system manufacturers and, thus, has been implemented within many commercially available processor systems. In practice, SMBIOS provides data structures (e.g., in the form of tables) that function as a repository of information collected by the BIOS during the boot process (i.e., prior to execution of the operating system) of a processor system. The information collected by the BIOS during the boot process and stored within the SMBIOS data structures includes information or data describing the make up or configuration of the processor system executing the BIOS. Subsequent to the boot process, the data or information stored within the SMBIOS data structures is accessible by the operating system and/or one or more runtime utilities. Accordingly, a system user or other operator of the processor system may access (e.g., may view via a video monitor) such data or information for the purpose of assessing the configuration of a particular computer or processor system, debugging the computer or processor system, etc.

One early execution environment phase that the BIOS typically performs is commonly referred to as the power on self test (POST) phase. During the POST phase, the processor or computer system scans for option or expansion read only memories (ROMs) that may be located on board (e.g., on the motherboard of the processor system) or within a video card, modem card, etc. installed in an expansion slot of the processor system. During the POST phase, the processor system sequentially expands (i.e., loads) and executes the software routines or machine readable instructions stored in these expansion ROMs. In particular, as the BIOS scan detects the presence of a particular expansion ROM, it suspends the scanning process to expand and execute the firmware routines or machine readable instructions stored in that particular expansion ROM before resuming scanning for another expansion ROM.

Each of the expansion ROMs includes one or more routines or sets of machine readable instructions that require an amount of memory space for their execution. The BIOS typically provides such memory space, which is commonly referred to as legacy expansion ROM memory, for use in executing these routines or instructions. As each routine or set of instructions within a particular scanned expansion ROM is expanded and executed, the routine or instructions may consume an initial amount of memory within the legacy expansion ROM memory space and may release (i.e., make available) some or all of that memory space when the execution of the routine or instructions is complete.

Unfortunately, with many known processor systems the legacy expansion ROM memory space is filled during the scanning process before all of the expansion ROMs have had an opportunity to expand (i.e., load their contents into the legacy expansion ROM memory space) and execute. As a result, the processor system may be unable to support requests made during subsequent execution of the expansion ROM scan, which may result in error messages, software execution failures, etc. that require a re-boot of the processor system.

In some processor systems it is possible to determine at runtime (i.e., when the operating system is executing) the amount of memory that is consumed by successfully expanded and executed expansion ROM routines. While such memory consumption information may prove somewhat useful in determining what expansion ROM routines or instructions were loaded into the legacy expansion ROM memory space and executed by the processor system prior to an operating system boot failure and/or error message, such information is incomplete. In particular, information associated with the memory space requirements of expansion ROM routines or instructions that were not expanded (e.g., due to the legacy expansion ROM space being filled) is not available to the operating system. Furthermore, the initial memory space requirements associated with the expansion ROM routines that were successfully loaded is not accessible to the operating system. Thus, in the event of a boot failure, it is difficult, if not impossible, for a system user or operator to determine what combination of available expansion ROMs can be expanded and executed using the relatively limited legacy expansion ROM space. As a result, users often enable/disable various combinations of expansion ROMs using time consuming trial and error methods until the computer system boots without error.

DETAILED DESCRIPTION

Figure 1:
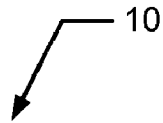
FIG. 1 is a table depicting an example data structure that may be used to implement the examples described herein.

FIG. 1 is a table depicting an example data structure 10 that may be used to implement the examples described herein. Preferably, the example data structure 10 contains expansion ROM memory information and is compliant with the well-known SMBIOS standard or specification. However, the example data structure 10 does not necessarily have to be compliant with the SMBIOS specification and may instead be compliant with another standard or specification or, alternatively, may not comply with any particular standard or specification.

As described in greater detail below in connection with FIGS. 2-5, instances of the data structure 10 are used in conjunction with the examples described herein to store memory size information pertaining to option or expansion ROMs that are detected by a system BIOS during a processor system boot process (i.e., prior to execution of an operating system). More specifically, the examples described herein populate one or more instances of the data structure 10 with expansion ROM memory size information. Each instance of the data structure corresponds to a particular expansion ROM detected by the BIOS in the early execution phases (i.e., prior to execution of an operating system) of a computer or processor system (e.g., the system shown and described in connection with FIG. 5).

Following the boot phase (i.e., when the operating system is executing, runtime, etc.), the illustrated processor system holds one populated instance of the data structure 10 for each expansion ROM detected by the BIOS. Among other information or data, these instances of the expansion ROM data structure 10 contain detailed information pertaining to the boot or pre-operating system memory usage characteristics of the software routines or machine readable instructions stored in each of the expansion ROMs. Because instances of the data structure 10 (and the data or information they contain) persist following the boot phase, the operating system and/or other utilities can access the instances of the expansion ROM data structure 10 to facilitate runtime debugging activities, system configuration optimization activities, etc. associated with the expansion ROMs.

Referring to FIG. 1, the data structure 10 is composed of a plurality of data fields, each of which has an associated offset, a name, a length and a value. The offset is a predetermined number of bytes from a base memory address for the instance to a particular field within the instance. In the example data structure 10 shown in FIG. 1, the field associated with the offset "00h" is a "Type" field. A plurality of instances of the data structure 10 may be stored in a memory associated with a processor system and the base memory locations for each instance of the data structure 10 may be stored in a look-up table or the like to enable the operating system, runtime utilities, etc. to easily locate and access a particular instance of the data structure 10 according to its base memory address. Further, a particular one of the data fields within a particular instance of the data structure 10 may be accessed by using the corresponding offset value to index from the base address of that data structure instance to the particular one of the data fields within that data structure instance.

The example expansion ROM data structure 10 of FIG. 1 includes the "Type" field at offset 00h, a "Length" field at offset 01h and a "Handle" at offset 02h, all of which are required fields and offsets defined under the well-known SMBIOS 2.3.1 specification. The "Type" field value indicates the type of information that is stored within the instance of the data structure 10 (i.e., the type of the data structure). Under the SMBIOS 2.3.1 specification, the types 80h through FFh are available for use by original equipment manufacturers (OEMs) to define custom or OEM specific data structure types. Thus, if compliance with the SMBIOS 2.3.1 specification is desired, the methods and apparatus described herein may use a value of either 80h through FFh in the "Type" field value to indicate an expansion ROM information type data structure.

The "Length" field contains the one-byte value 0Bh (i.e., decimal eleven), which equals the number of bytes that compose each instance of the data structure 10.

The "Handle" field contains a two-byte value that functions as an identifier to represent a unique instance of the data structure 10. Thus, the value of the handle must be unique to the associated instance. The handle may be used with known SMBIOS functions to retrieve a particular instance of the data structure 10.

The "Expansion ROM Space" field holds a one-byte value representing the total amount of memory space provided for expansion ROM use in 512 byte increments. For a given processor system, the total amount of available memory available for expansion ROM use is fixed and, thus, all instances of the expansion ROM information data structure 10 stored within that processor system will have the same amount of available memory space and the same value stored in the "Expansion ROM Space" field.

The "Bus" field holds a one-byte value representing the bus number of the device executing the expansion ROM associated with an instance of the data structure 10.

The "Device/Function" field holds a one-byte value, bits three through seven of the value contain the device number of the device associated with a particular expansion ROM. Bits zero through two of the value contain the function number.

The "Load Size" field holds a one-byte value that represents the load size of the expansion ROM associated with a particular instance of the data structure 10 in 512 byte increments. In other words, the field "Load Size" represents the amount of memory required within the BIOS memory for the BIOS to execute the firmware or machine readable instructions stored on the expansion ROM during the boot phase (i.e., prior to execution of the operating system or establishment of the runtime environment).

The "Runtime Size" field holds a one-byte value that represents the amount of BIOS memory space (in 512 byte increments) required by a particular expansion ROM to perform its runtime functions or activities. Normally, the value associated with the field "Runtime Size" is smaller than the value associated with the field "Load Size."

The "Slot Location" field holds a one-byte value that represents the processor system slot location of the expansion ROM device associated with a particular instance of the data structure 10. The one-byte value may be 1-based so that up to 255 slots can be represented by the one-byte value. Alternatively, each bit position of this value may represent a particular expansion slot within the processor system, thereby enabling the one-byte value associated with this field to represent eight different slots. In any event, if the one-byte for the "Slot Location" field is zero, then the expansion ROM device associated with the data structure 10 is on-board (e.g., is integral with the motherboard of the processor system).

The "Status" field holds a one-byte value. Bits one through seven of this value are always zero. Bit zero of this value is set to one if the expansion ROM instructions have been successfully expanded. On the other hand, bit zero of the "Status" field is set to zero if the expansion ROM instructions fail to expand.

Of course, the fields associated with the example data structure 10 could be organized in any desired manner to represent expansion ROM information acquired prior to execution of an operating system (e.g., during a boot phase or the like). For example, the fields may be organized in a different order (e.g., using different offsets), more, fewer and/or different fields could be included/excluded if desired, etc.

Figure 2:
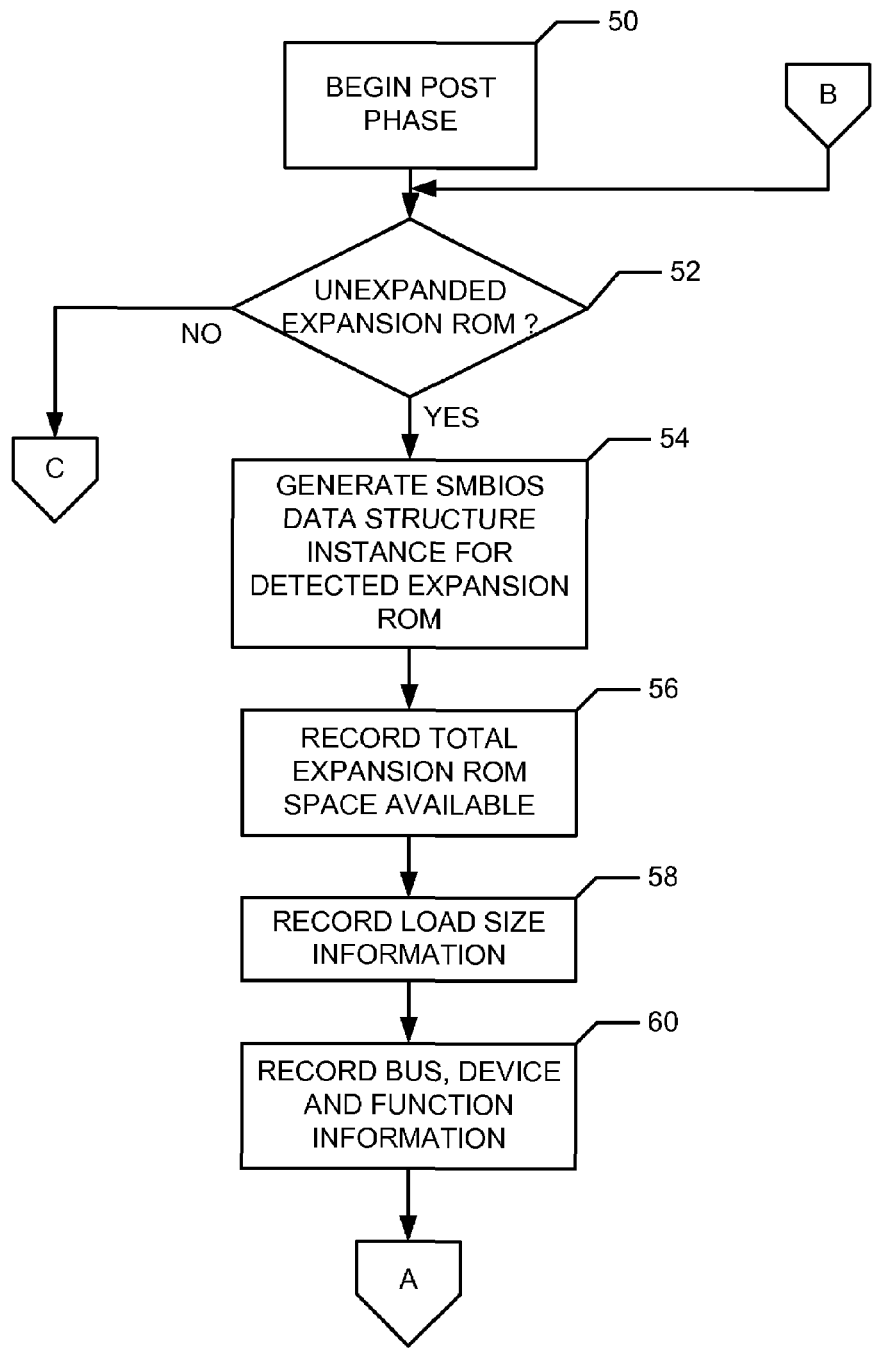
FIGS. 2-4 are an example flow diagram that depicts one manner in which the system shown in FIG. 5 may be configured to acquire expansion read only memory size information prior to operating system execution.
Figure 3:
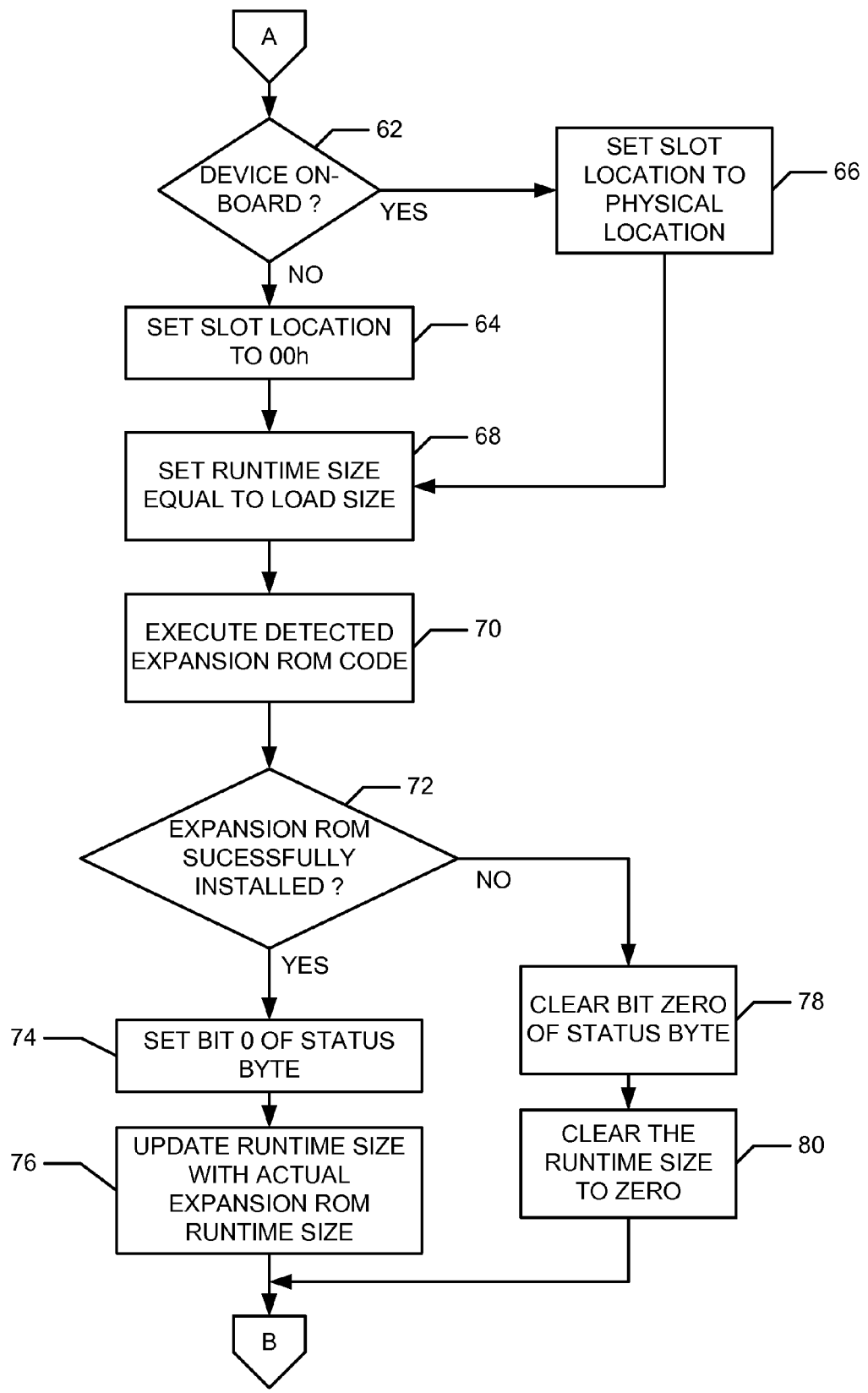
Figure 4:
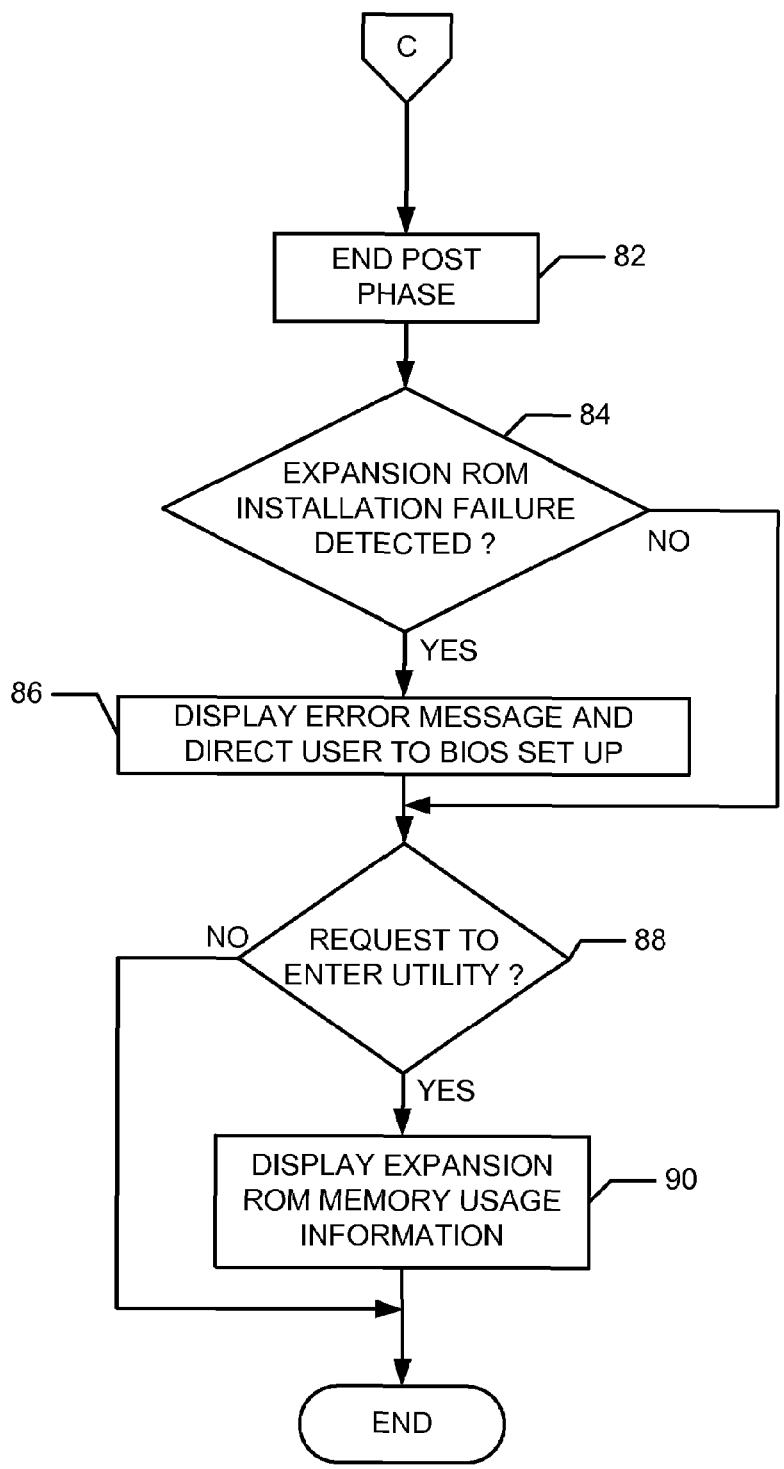
Figure 5:
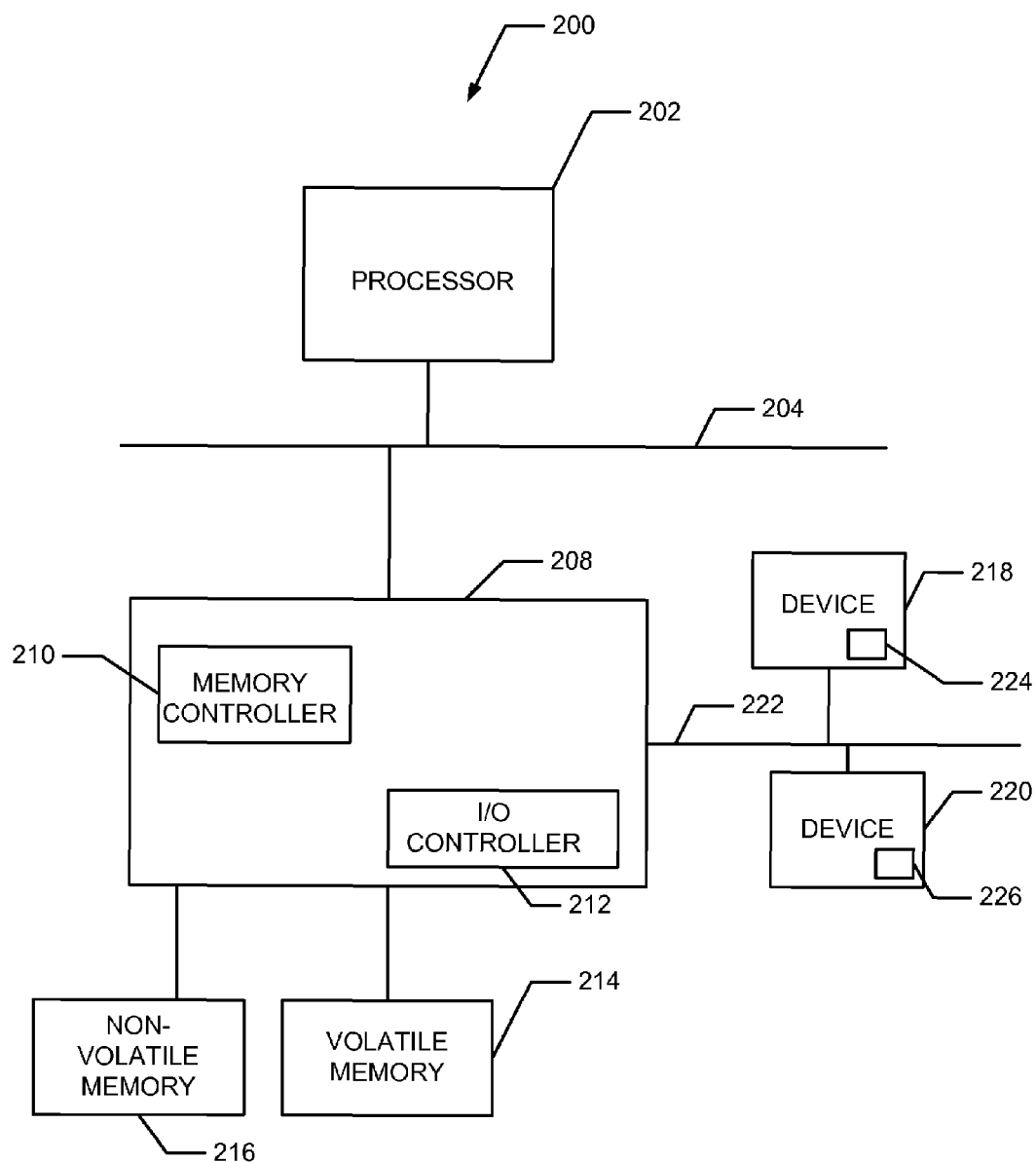
FIG. 5 is an example processor system that may be used to implement the methods described herein.

FIGS. 2-4 are an example flow diagram that depicts one manner in which the processor system 200 shown in FIG. 5 may be configured to acquire expansion read only memory size information prior to operating system execution. Following the initiation of a POST phase (block 50) within the processor system 200, the processor system BIOS determines if an unexpanded expansion ROM is present (block 52). If the BIOS detects that an unexpanded expansion ROM is present, the BIOS generates a SMBIOS expansion ROM data structure instance for the detected expansion ROM (block 54). Preferably, the data structure instance generated by the BIOS has the structure of the example data structure 10 shown in FIG. 1. If such is the case, the BIOS may generate the data structure instance by populating or recording values in the "Type," "Length," "Handle" and the remaining fields of the generated data structure instance.

In particular, the BIOS records the total expansion ROM space available in the "Expansion ROM Space" field (block 56), the load size of the routines or machine readable instructions stored in the expansion ROM in the "Load Size" field (block 58), the bus number of the device executing the expansion ROM in the "Bus" field (block 60), and the device number and function in the "Device/Function" field (block 60).

The BIOS then determines whether the device associated with the detected expansion ROM is on-board (FIG. 3, block 62). If the device is not on-board (i.e., is associated with an expansion slot), the BIOS stores the value 00h in the "Slot Location" field. On the other hand, if the BIOS determines that the device is on-board (block 62), then the BIOS stores a value in the "Slot Location" field that corresponds to the physical location of the device (e.g., the expansion slot location) (block 66). After the BIOS has set the slot location (blocks 64 or 66), the BIOS stores a value representative of the load size of the routines or instructions in the expansion ROM in the "Load Size" field (block 68). The BIOS then executes the expansion ROM code, routines or instructions that have been expanded (i.e., loaded) in the BIOS expansion ROM memory (e.g., the legacy expansion ROM memory) (block 70).

The BIOS next determines if the software or instructions associated with the detected expansion ROM have been successfully installed (block 72). If the software or instructions have been successfully installed (block 72), the BIOS sets bit zero of the "Status" field byte to one (block 74) and then updates the values stored in the "Runtime Size" with the actual runtime memory usage of the expansion ROM (block 76). On the other hand, if the BIOS determines that the software or instructions associated with the detected expansion ROM have not been successfully installed (block 72), the BIOS clears bit zero (i.e., resets the bit to zero) of the "Status" field byte (block 78) and resets the value stored in the "Runtime Size" field to zero (block 80).

Control then returns to block 52 (FIG. 2) so that the BIOS can again determine if there are any further expansion ROMs that have not yet been accessed, expanded, etc. by the BIOS. If there are no further expansion ROMs to be accessed and expanded by the BIOS, the BIOS ends the POST phase (FIG. 4, block 82).

After the BIOS concludes the POST phase (FIG. 4, block 82), the operating system (or some other runtime error management utility) may access the instances of the expansion ROM data structure 10 created and populated by the BIOS as described above in connection with blocks 52 through 80 to determine if there were any installation failures (block 84). Specifically, the operating system or other runtime utility may review bit zero of the "Status" field of each instance of the data structure 10 to determine whether such a failure occurred. If one or more installation failures are detected at block 84, the operating system or other utility displays an appropriate error message(s). It is then determined (at block 88) whether the user has made a request to enter a utility such as, for example, an operating system utility or another runtime utility, a BIOS set up utility or function, etc. If such a request has been made, the utility accesses the instances of the data structure 10 created and populated as set forth above in connection with blocks 52-80 and displays expansion ROM memory usage information (block 90). Of course, the request to enter a utility (block 88) and/or the display of expansion ROM memory usage information (block 90) do not necessarily have to be performed.

The flowchart depicted in FIGS. 2-4 may be implemented as machine readable instructions that comprise a program for execution by a processor such as the processor 202 shown in the example processor system 200 discussed below in connection with FIG. 5. The program may be embodied in software stored on a tangible medium such as a CD-ROM, a floppy disk, a hard drive, a digital versatile disk (DVD), or a memory associated with the processor 202, but persons of ordinary skill in the art will readily appreciate that the entire program and/or parts thereof could alternatively be executed by a device other than the processor 202 and/or embodied in firmware or dedicated hardware in a well-known manner. Additionally, the order of execution of the blocks may be changed, and/or some of the blocks described may be changed, eliminated, or combined.

FIG. 5 is a block diagram of an example processor system 200 that may be used to implement the examples described herein. The processor system 200 can be, for example, a server, a personal computer, a personal digital assistant (PDA), an Internet appliance, a DVD player, a CD player, a digital video recorder, a personal video recorder, a set top box, or any other type of computing device.

As shown in FIG. 5, the processor system 200 includes a processor 202 that is coupled to an interconnection bus or network 204. The processor 202 can be a processing unit or microprocessor such as, for example, a processor selected from the Intel Itanium® family, Intel X-Scale® family, the Intel Pentium® family, etc. Although not shown in FIG. 5, the system 200 may be a multi-processor system and, thus, may include one or more additional processors that are identical or similar to the processor 202 and which are coupled to the interconnection bus or network 204.

The processor 202 of FIG. 5 is coupled to a chipset 208, which includes a memory controller 210 and an input/output (I/O) controller 212. As is well known, a chipset typically provides I/O and memory management functions as well as a plurality of general purpose and/or special purpose registers, timers, etc. that are accessible or used by one or more processors coupled to the chipset. The memory controller 210 performs functions that enable the processor 202 (or processors if there are multiple processors) to access a volatile memory 214, which may include any desired type of volatile memory such as, for example, synchronous dynamic random access memory (SDRAM), dynamic random access memory (DRAM), RAMBUS dynamic random access memory (RDRAM) etc. The memory controller 210 may also have access to a non-volatile memory 216, which may include, for example, on-board read only memories (ROMs) implemented using, for example, electrically erasable programmable read only memory (EEPROM) or any other type of read only memory. The BIOS for the processor system 200 may be stored in the non-volatile memory 216 and accessed for execution by the processor 202 immediately following a reset operation, the application of power to the processor system 200 (i.e., a power up) and/or as needed during runtime to perform tasks for the operating system or other system utilities.

The I/O controller 212 performs functions that enable the processor 202 to communicate with devices 218 and 220 via a bus 222. The devices 218 and 220 may be any desired type of device such as, for example, a video adapter, a disk drive (e.g., a mass storage device), a network interface adapter, etc. The devices 218 and 220 can be installed in separate expansion slots. In addition, the devices 218 and 220 include respective expansion ROMs 224 and 226, each of which contains software, firmware or machine readable instructions that may be expanded and executed by the BIOS during the POST phase of the boot process. In this manner, the BIOS can configure the processor system 200 so that during runtime (i.e., when the operating system is executing), the operating system and/or other runtime utilities can communicate or otherwise interoperate with the devices 218 and 220.

While the memory controller 210 and the I/O controller 212 are depicted in FIG. 5 as separate functional blocks within the chipset 208, the functions performed by these blocks may be integrated within a single semiconductor circuit or may be implemented using two or more separate integrated circuits.

While the methods and apparatus described herein are described in connection with an example that acquires expansion ROM memory size information and generates and populates instances of an SMBIOS compliant expansion ROM information data structure with this memory size information, the expansion ROM memory size information could be acquired in other manners. For example, the BIOS may be used to call user defined binary code that carries out the methods described herein.

Although certain methods and apparatus have been described herein, the scope of coverage of this patent is not limited thereto. To the contrary, this patent covers all embodiments fairly falling within the scope of the appended claims either literally or under the doctrine of equivalents.

What is claimed is:

1. A method, comprising:
accessing an instance of a data structure generated prior to execution of an operating system;
determining a boot phase memory usage associated with expansion read only memory;
detecting an expansion read only memory installation failure after executing expansion read only memory code; and
in response to the installation failure, displaying boot phase memory usage information associated with the expansion read only memory and clearing a runtime size value of the boot phase memory usage associated with the failed expansion read only memory.

2. A method as defined in claim 1, wherein the data structure is accessed during a boot phase of a processor system.

3. A method as defined in claim 1, wherein displaying the boot phase memory usage information includes displaying at least one of a load size or a runtime size.

4. A method as defined in claim 1, wherein the expansion read only memory is configured to store at least one program, and wherein the boot phase memory usage information corresponds to the program.

5. A method as defined in claim 1, further comprising configuring the data structure to remain stored after completion of the boot phase.

6. A method as defined in claim 5, further comprising enabling programs associated with an operating system to access the data structure after completion of the boot phase.

7. A method as defined in claim 1, wherein the data structure is configured to store status information indicative of an installation success or an installation failure associated with the expansion read only memory.

8. An apparatus, comprising:
a processor; and
a memory configured to store instructions that cause the processor to:
access an instance of a data structure generated prior to execution of an operating system;
determine a boot phase memory usage associated with expansion read only memory;
detect an expansion read only memory installation failure after executing expansion read only memory code; and
in response to the installation failure, display boot phase memory usage information associated with the expansion read only memory and clearing a runtime size value of the boot phase memory usage associated with the failed expansion read only memory.

9. An apparatus as defined in claim 8, wherein the instructions cause the processor to access the data structure during a boot phase of the processor.

10. An apparatus as defined in claim 8, wherein the instructions cause the processor to display the boot phase memory usage information by displaying at least one of a load size or a runtime size.

11. An apparatus as defined in claim 8, wherein the expansion read only memory is configured to store at least one program, and wherein the boot phase memory usage information corresponds to the program.

12. An apparatus as defined in claim 8, wherein the instructions cause the processor to configure the data structure to remain stored after completion of the boot phase.

13. An apparatus as defined in claim 8, wherein the instructions cause the processor to configure the data structure to store status information indicative of an installation success or an installation failure associated with the expansion read only memory.

14. A tangible medium having instructions stored thereon that, when executed, cause a machine to:
access an instance of a data structure generated prior to execution of an operating system;
determine a boot phase memory usage associated with expansion read only memory;
detect an expansion read only memory installation failure after executing expansion read only memory code; and
in response to the installation failure, display boot phase memory usage information associated with the expansion read only memory and clearing a runtime size value of the boot phase memory usage associated with the failed expansion read only memory.

15. A tangible medium as defined in claim 14 having instructions stored thereon that, when executed, cause the machine to access the data structure during a boot phase of the processor.

16. A tangible medium as defined in claim 14 having instructions stored thereon that, when executed, cause the machine to display the boot phase memory usage information by displaying at least one of a load size or a runtime size.

17. A tangible medium as defined in claim 14, wherein the expansion read only memory is configured to store at least one program, and wherein the boot phase memory usage information corresponds to the program.

18. A tangible medium as defined in claim 14 having instructions stored thereon that, when executed, cause the machine to configure the data structure to remain stored after completion of the boot phase.

19. A tangible medium as defined in claim 18, wherein the instructions cause the processor to enable programs associated with an operating system to access the data structure after completion of the boot phase.

20. A tangible medium as defined in claim 14 having instructions stored thereon that, when executed, cause the machine to configure the data structure to store status information indicative of an installation success or an installation failure associated with the expansion read only memory.

* * * * *